United States Patent
Pang et al.

(10) Patent No.: US 7,529,054 B2
(45) Date of Patent: May 5, 2009

(54) ADAPTIVE RECORDING BAND EXPANSION METHODOLOGY

(75) Inventors: Jimmy TzeMing Pang, Singapore (SG); UttHeng Kan, Singapore (SG); Djohni Chandra, Singapore (SG); KokHoe Chia, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 626 days.

(21) Appl. No.: 10/824,861

(22) Filed: Apr. 15, 2004

(65) Prior Publication Data

US 2005/0231842 A1   Oct. 20, 2005

(51) Int. Cl.
*G11B 21/02* (2006.01)

(52) U.S. Cl. .................. 360/75; 360/31; 360/77.04; 360/77.06; 360/77.07

(58) Field of Classification Search ............... None
See application file for complete search history.

(56) References Cited

U.S. PATENT DOCUMENTS

| | | | |
|---|---|---|---|
| 4,435,752 A | 3/1984 | Winkelman | |
| 4,471,396 A | 9/1984 | Iftikar | |
| 5,485,321 A | 1/1996 | Leonhardt | |
| 5,596,458 A | 1/1997 | Emo | |
| 5,870,237 A | 2/1999 | Emo | |
| 6,005,725 A | 12/1999 | Emo | |
| 6,040,955 A * | 3/2000 | Brown et al. | 360/75 |
| 6,061,195 A | 5/2000 | Wilson | |
| 6,091,559 A | 7/2000 | Emo | |
| 6,130,796 A * | 10/2000 | Wiselogel | 360/75 |
| 6,140,784 A * | 10/2000 | Mazda | 318/280 |
| 6,239,937 B1 * | 5/2001 | Troemel | 360/75 |
| 6,260,257 B1 * | 7/2001 | Emo et al. | 29/603.09 |
| 6,480,361 B1 * | 11/2002 | Patterson | 360/254.3 |
| 6,567,232 B1 * | 5/2003 | Klaassen | 360/75 |
| 6,600,622 B1 * | 7/2003 | Smith | 360/77.06 |
| 6,628,482 B2 * | 9/2003 | Hong et al. | 360/265.1 |
| 6,754,031 B1 * | 6/2004 | Kisaka | 360/77.02 |
| 6,822,821 B2 * | 11/2004 | Gan et al. | 360/75 |
| 6,940,679 B1 * | 9/2005 | McNeil et al. | 360/77.04 |
| 7,054,091 B2 * | 5/2006 | Swize | 360/75 |
| 7,215,498 B2 * | 5/2007 | Calfee et al. | 360/75 |
| 2001/0048570 A1 * | 12/2001 | AbouJaoude et al. | 360/77.04 |
| 2004/0080862 A1 * | 4/2004 | Miyata et al. | 360/78.05 |
| 2004/0160696 A1 * | 8/2004 | Meyer | 360/77.05 |

* cited by examiner

*Primary Examiner*—Hoa T Nguyen
*Assistant Examiner*—Dismery E Mercedes
(74) *Attorney, Agent, or Firm*—John D. Veldhuis-Kroeze; Westman, Champlin & Kelly, P.A.

(57) ABSTRACT

A method, and system configured to implement the method, are provided. The method includes the steps of identifying a last usable track on a surface as a function of a parameter, and defining a standoff band of tracks relative to the last usable track to obtain an achieved maximum track on the surface. The last usable track is, in exemplary embodiments, a track beyond a default maximum track on a surface of a data storage medium.

14 Claims, 6 Drawing Sheets

ADAPTIVE RECORDING BAND EXPANSION METHODOLOGY

FIELD OF THE INVENTION

The present invention relates generally to data storage systems. More particularly, the present invention relates to methods of expanding a recording band of a data storage media.

BACKGROUND OF THE INVENTION

One type of mass storage device is a disc drive data storage system. Disc drive data storage systems include, for example, one or more magnetic or optical storage discs. In disc drives which include multiple storage discs, the discs are mounted on a spindle for co-rotation about a central axis. Each disc surface has an associated head slider (or "head") which includes a transducer for reading data from the disc surface. Data is stored on the disc surface in circular, concentric data tracks. A "cylinder" is the set of tracks (one per each disc surface) which have the same radius from the central axis.

The ever-increasing demand for storage capacity has driven significant increases in areal density growth rate. Compound areal density growth rate has been projected at sixty percent per year for years to come. High recording densities are possible only if adequate signal-to-noise ratios (SNR) are achievable. In current longitudinal recording systems, SNR improvements are achieved by reducing the grain size distribution and grain volume. However, this potentially results in thermally unstable grain magnetization and thermal decay of the written information over a span of time. Additionally, write field limitations are having a capping influence on further expansion of longitudinal recording areal densities.

Perpendicular magnetic recording technologies are expected to be widely employed in data storage systems in the near future. These perpendicular recording technologies are expected to reduce the above-described technical difficulties in the longitudinal recording field. However, there exists a different set of technical difficulties and maturity problems for perpendicular recording. Currently, there is no clear indication or agreement in the industry on the transition point (i.e., at what areal density) where longitudinal recording will be replaced by perpendicular recording. Thus, methods of expanding the life span of longitudinal recording during this transition period are needed. Further, techniques for increasing storage capacity are always needed, whether it be for longitudinal recording, perpendicular recording, or any other magnetic, optical or other recording technology.

Embodiments of the present invention provide solutions to these and/or other problems, and offer other advantages over the prior art.

SUMMARY OF THE INVENTION

A method, and system configured to implement the method, are provided. The method includes the steps of identifying a last usable track on a surface as a function of a parameter, and defining a standoff band of tracks relative to the last usable track to obtain an achieved maximum track on the surface. The last usable track is, in exemplary embodiments, a track beyond a default maximum track on a surface of a data storage medium.

In some embodiments, the step of identifying the last usable track on the surface as a function of the parameter further comprises identifying the last usable track as a function of a bias or position parameter. The bias parameter can be a parameter associated with an actuator which positions a data head over the surface of the recording media. The last usable track can be identified based upon when the bias parameter exceeds a threshold. For example, the last usable track can be identified by determining when an average bias slope exceeds a predetermined percentage of an overall average bias slope. As another example, the last usable track can be identified by determining when a rate of change of the bias parameter exceeds a threshold rate of change of the bias parameter.

In some embodiments, the step of identifying the last usable track as a function of the bias or position parameter further comprises identifying the last usable track as a function of a position error signal (PES) value. For example, the last usable track can be identified as a function of when the PES value exceeds a predetermined percentage of an average PES value. The last usable track can also be identified as a function of when a track PES exceeds a predetermined percentage of a maximum budgeted PES.

Other features and benefits that characterize embodiments of the present invention will be apparent upon reading the following detailed description and review of the associated drawings.

BRIEF DESCRIPTION OF THE DRAWINGS

FIGS. 5-1 and 5-2 are flow diagrams illustrating a more particular embodiment of aspects of the method illustrated in FIG. 3.

DETAILED DESCRIPTION OF ILLUSTRATIVE EMBODIMENTS

The present invention provides methods and apparatus which adaptively expand the real estate on a recording medium, for example a data storage disc, on which data can be stored. Expansion of the recordable real estate results in expansion of the recording band. Among other uses, the methods and apparatus of the present invention can be used as system level approaches to expanding the life span of longitudinal recording technologies. Extra real estate on the recording medium drives down linear or areal density requirements needed to achieve a particular data storage capacity, and subsequently diminishes the signal-to-noise ratio (SNR) gap. The present invention can also be used in mass storage devices which utilize recording technologies other than longitudinal recording technologies.

Figure 1:
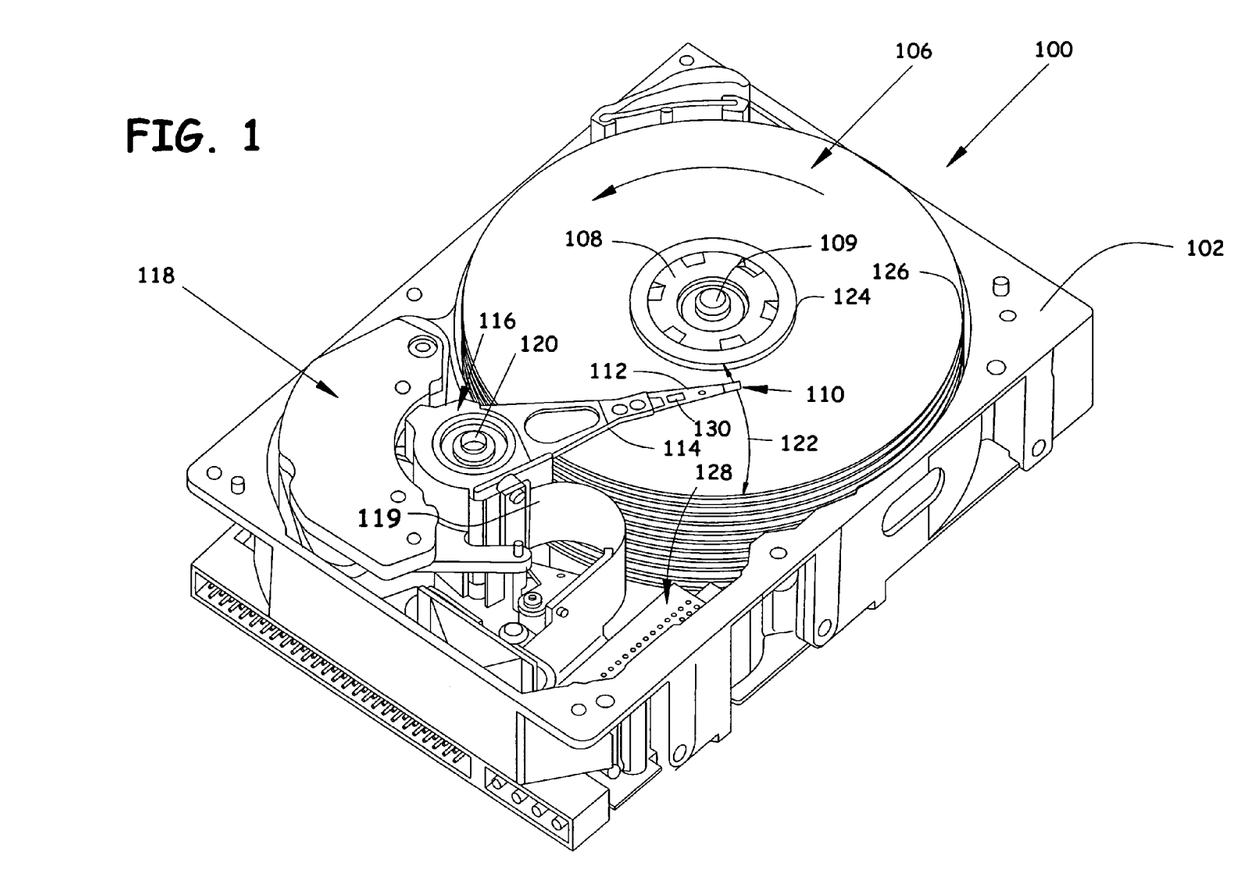
FIG. 1 is a perspective view of a disc drive type mass storage device.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109.

Each disc surface has an associated disc head slider 110 which is mounted to disc drive 100 for communication with the disc surface. Sliders 110 support MR heads for reading data from the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics (diagrammatically included within electronics 128) based on signals generated by heads 110 and a host computer (not shown). A printed flex circuit 119 connects VCM 118 to the electronics 128. A micro-actuator 130, which provides fine position control of heads 110, is used in combination with VCM 118 that provides relatively coarse positioning of heads 110.

While disc drive 100 is shown in FIG. 1 for illustrative purposes, the present invention is not limited to use with disc drive data storage systems. Instead, the present invention applies to mass storage devices which utilize a recording media surface having a recording band on which data can be stored.

Figure 2:
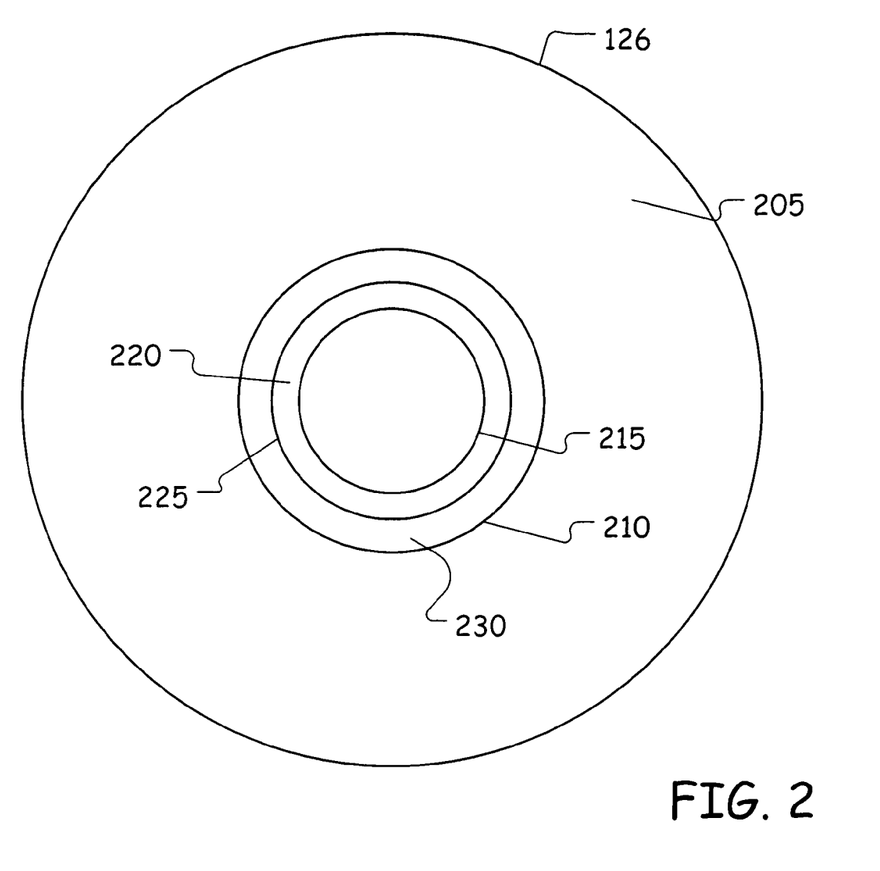
FIG. 2 is a diagrammatic plan view of a data storage media surface illustrating aspects of the present invention.

FIG. 2 is a diagrammatic plan view of a data storage media surface 205 illustrating aspects of the present invention. Media surface 205 can be, for example, a surface of a disc in disc pack 106 shown in FIG. 1. In one particularly useful application of the invention, surface 205 is a surface of a magnetic storage disc on which data is recorded in a longitudinal format. Also shown in FIG. 2 are a default maximum track location 210 and an inner diameter (ID) crash stop location 215 for the media surface. The default maximum track location 210 is an innermost track on which data is to be recorded based upon default parameters established for the particular type and model of mass storage device 100. Thus, the default recording band includes portions of the media surface 205 between the outer diameter 126 (or an outer diameter crash stop) and the default maximum track location 210. The present invention adaptively expands the recording band on the surface beyond the default recording band, which in turn eases storage density requirements needed to achieve a particular data storage capacity for the media surface. Other features illustrated in FIG. 2 are described below with reference to FIG. 3.

Figure 3:
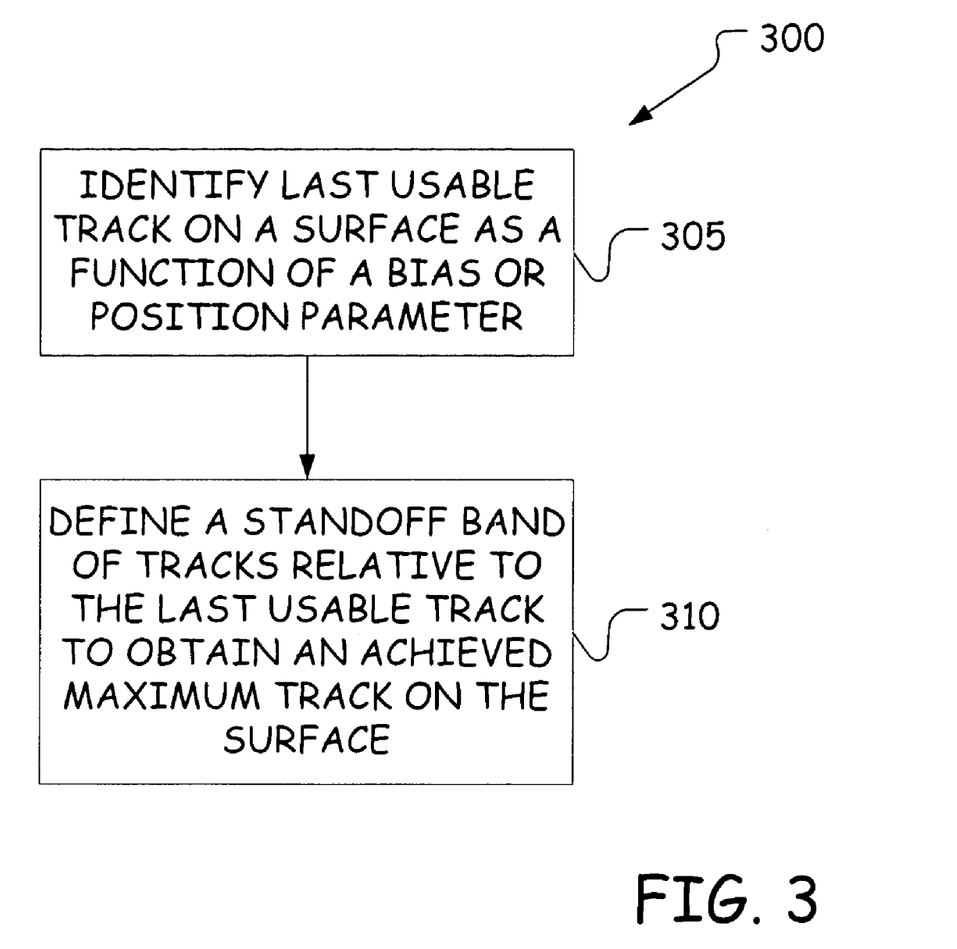
FIG. 3 is a flow diagram illustrating a method in accordance with embodiments of the present invention.

FIG. 3 is a flow diagram 300 illustrating a method of the present invention. As shown at block 305 in FIG. 3, the method includes the step of identifying the last usable track on a surface as a function of a bias or position parameter. In the example illustrated in FIG. 2, the last usable track on surface 205 corresponds to the ID crash stop location 215. The bias parameter is, in some embodiments, associated with the actuator (for example actuator 116) which positions the data head (for example head slider 110) over the recording media. The step of identifying the last usable track as a function of the bias parameter can include, for example, determining when the bias parameter exceeds a predetermined value. This is indicative of when the actuator encounters an obstruction, for example the ID crash stop. Further description of more particular embodiments of the step of identifying the last usable track as a function of the bias or position parameter are provided below.

After the last usable track is identified, in the step shown at block 310, a standoff band of tracks (shown at 220 in FIG. 2) is defined or allocated relative to the last usable track (corresponding to the ID crash stop location 215 in FIG. 2) in order to obtain or identify an achieved maximum track (shown at 225 in FIG. 2) on the surface 205. In one example, the standoff band of tracks is 400 tracks, but other standoff band sizes can be used. The standoff band of tracks takes care of any thermal or mechanical tolerances which change with time and temperature. The achieved maximum track location 225 is closer to the inner diameter of surface 205 than is default maximum track location 210. Thus, the recording band on surface 205 is expanded by the difference between the default maximum track and the achieved maximum track, minus the number of tracks in the standoff band. This gain in tracks can safely be added to the real estate or usable tracks on the media surface. The recording band expansion is represented in FIG. 2 at 230.

Various different procedures can be used to implement the method steps illustrated in FIG. 3. In one such procedure, provided as an example, the actuator arm of the storage device is biased toward the ID crash stop using single track increments until a bias parameter estimate indicates that an obstruction has been encountered. The obstruction is likely to be the ID crash stop. Any attempt to seek further significantly beyond that limiting point results in the servo system not being able to achieve the target track, and the servo system reporting a track following error and initiating a recovery attempt. The actual determination of whether the actuator has reached the crash stop is made, in this example, when the rate of change of the bias parameter estimate exceeds a threshold rate of change of the bias parameter estimate.

The bias estimate indicates how much 'constant' force is acting on the actuator when it is held at a certain radial location on the disc drive. It changes depending on the radial location (or track number) at which the heads are positioned. Generally, the bias varies in a smooth fashion from ID to OD. It primarily includes forces corresponding to (1) the windage experienced by the actuator arm which is generated by the rotating disc; and (2) the spring force generated by the printed flex circuit which connects the VCM and the read/write heads to the connector at the head disc assembly (HAD) base. If the correct bias current is applied to the VCM while the disc is spinning, the arm will drift to the desired region where the actual experienced bias equals the bias force (due to the current) applied to the VCM.

The bias is part of a general state feedback controller which is used to control the actuator via the VCM. There are predefined limits for such parameters, beyond which the control algorithm may not be optimized, and which may cause bad tracking or higher than expected current, or even an overflow in the microprocessor variables used to represent and calculate the bias. Bias tends to be the highest at the extreme ID and OD of the actuator stroke. This is one reason that this particular parameter is selected to be observed. However, alternative "bias parameters" which may be used to replace the bias estimates include parameters like the average current applied to the voice coil when the actuator is held at its target location, or the average controller command used to hold the actuator at its target location.

Figure 4:
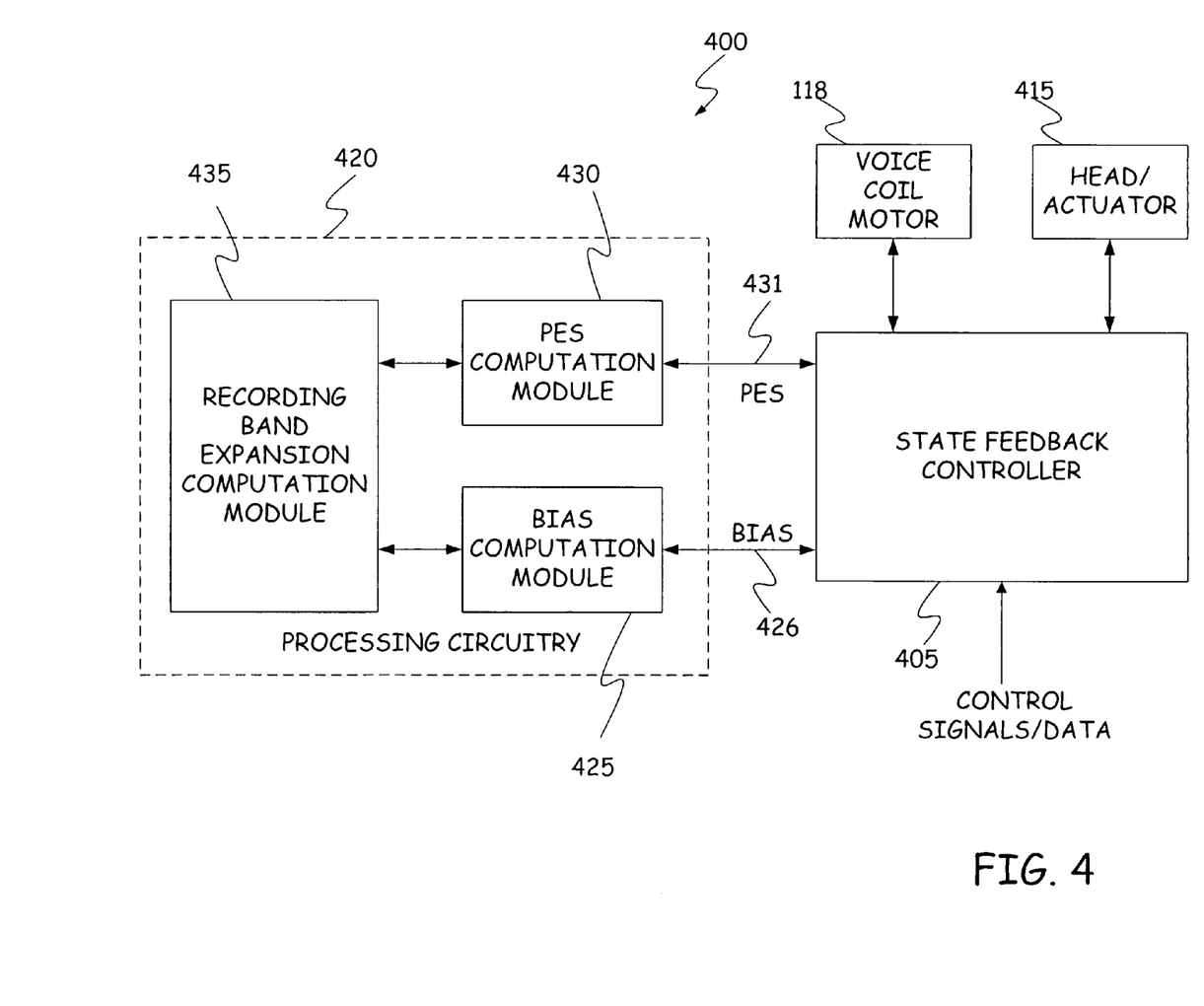
FIG. 4 is a block diagram illustrating a system in accordance with the present invention.

Various apparatus or systems can be used to implement the method of the present invention. One such apparatus or system 400 is shown in FIG. 4 and includes data storage system components. For example, system 400 includes state feedback controller 405 which controls the positioning of the data heads and actuator (collectively represented in FIG. 4 as head/actuator 415) via the VCM 118. In response to control signals/data, state feedback controller uses the control signals and position information obtained through head/actuator 415 to generate .VCM controlling signals (for example in the form of bias currents). Controller 405 generates the bias estimate parameter shown at 426 as described above. Controller also generates a position error signal (PES) shown at 431.

The PES represents the distance (or error) from the read head's current position to a desired target position. There typically exists a budget, often referred to as the Track Mis- Registration (TMR) budget, which takes into account the amount of error in the position in terms of quantities like non-repeatable runout, repeatable runout, squeeze between tracks, and off-track capability of the heads (how far they can go off-track before readback errors or writing errors occur). A number of other quantities are also considered, but the TMR budget spells out the maximum allowable values the quantities are allowed to reach before the safe writing limits are reached (or before the track is "misregistered"). The max budgeted PES quantities in this case would refer mainly to the non-repeatable and repeatable runout. Average PES may need to be considered if some general guidelines on the quality of the PES are to be applied which may exceed the budgeted guidelines, to ensure tracking quality.

Also included in system 400 is processing circuitry 420. Processing circuitry 420 can include, for example, bias computation module 425 and PES computation module 430 for performing additional computations on the bias estimate parameter and the PES 431, respectively. Based upon these additional computations and decisions, a recording band expansion computation module 435 identifies the achieved maximum track on the surface, and thus the recording band expansion.

Figure 51:
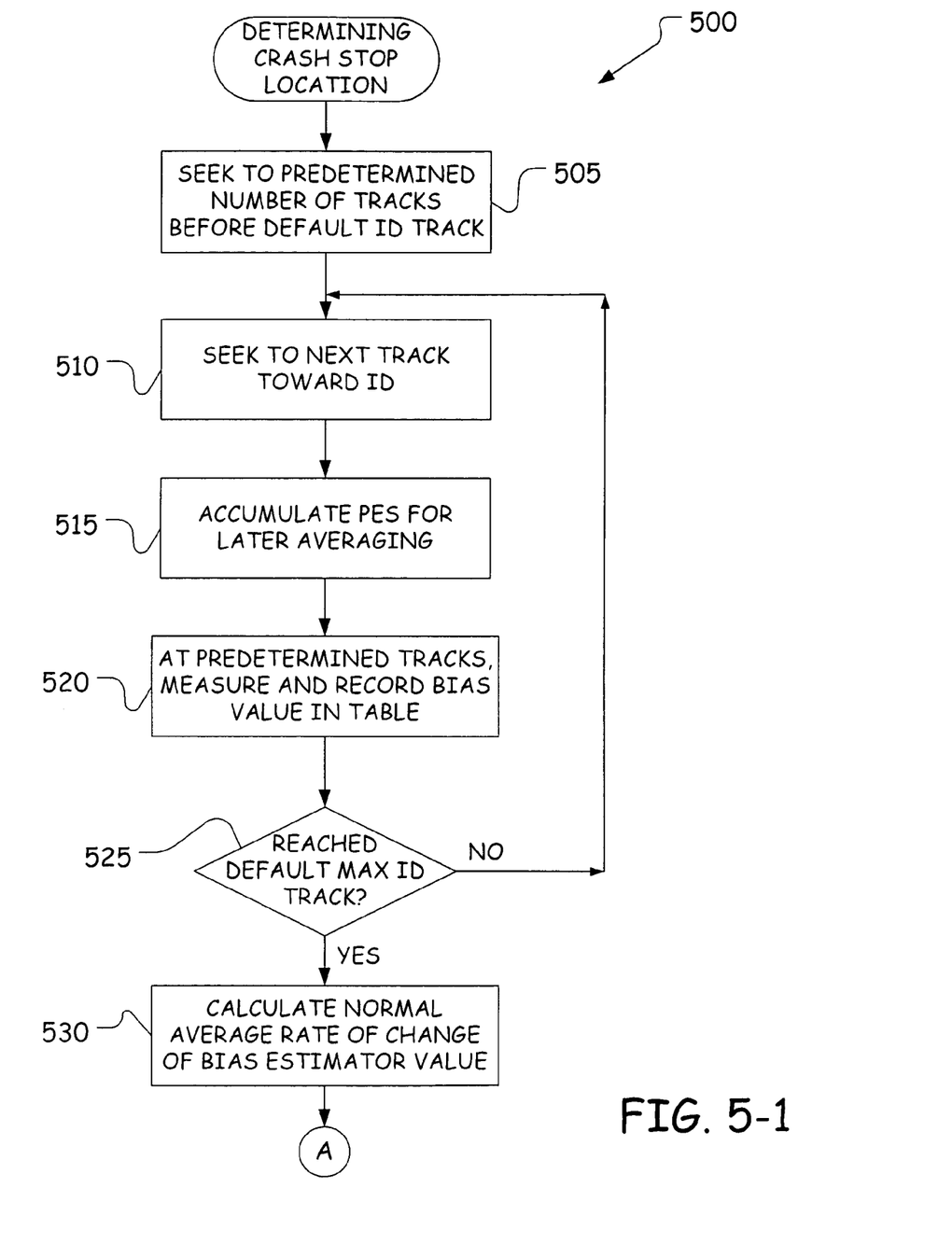
Figure 52:
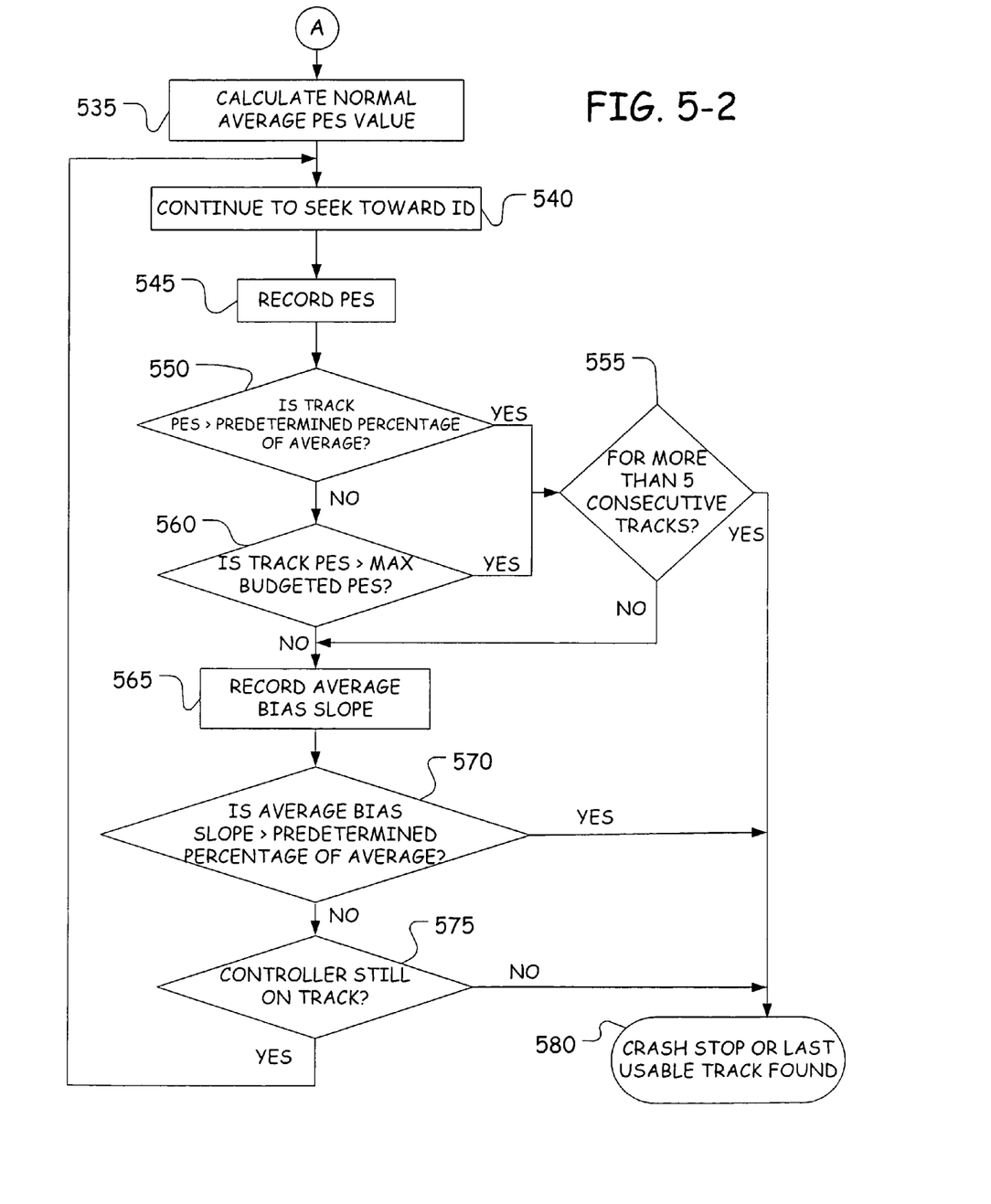

While system 400 is one example embodiment of an apparatus configured to implement the methods of the present invention, those of skill in the art will recognize that other systems can be used as well. For example, processing circuitry 420 need not have the modules illustrated in all embodiments, but rather can be configured in any manner which identifies the achieved maximum track on the surface, and thus the recording band expansion. A more particular embodiment of the methods of the present invention, implemented for example by system 400, is illustrated in FIGS. 5-1 and 5-2.

Referring now to FIGS. 5-1 and 5-2, shown is a flow diagram 500 illustrating a more particular embodiment of a method of identifying a crash stop location, and thus a location of a last usable track. After using this method to identify the last usable track, the standoff band of tracks can be defined relative to the last usable track to obtain the achieved maximum track or track location is described above. The method illustrated in FIGS. 5-1 and 5-2 includes the step shown at block 505 of seeking to within a predetermined number of tracks of the default ID track (i.e., the default maximum track location 210). In one particular embodiment, the predetermined number of tracks in this step is 100, such that the method includes seeking to a track which is 100 tracks before default ID track 210. This step can be implemented, for example, using controller 405 shown in FIG. 4.

Next, the method includes repetitively executing the series of steps illustrated at blocks 510, 515 and 520 until it is determined at the step shown at block 525 that the head has reached the default ID track or default maximum track location 210. The step shown in block 510 includes seeking to the next track toward the ID track. This step can also be implemented, for example, using controller 405 shown in FIG. 4. The step shown in block 515 includes accumulating the PES for later averaging (for example by module 430 shown in FIG. 4). The step shown in block 520 includes, at predetermined tracks, measuring bias values and recording the bias values in a table. In one particular embodiment, this step includes measuring the bias values at the first track and at the $100^{th}$ track, and recording these measured bias values in respective first and second tables, w(1) and w(2). This step can be implemented, for example, by module 425 shown in FIG. 4.

After it is determined in the step shown at block 525 that the head has reached the default ID track, which is the default maximum track location, the normal average rate of change of the bias estimator value is calculated. This is illustrated in block 530. In one embodiment, this step includes calculating the normal average rate of change of the bias estimator value for a predetermined number of tracks, for example ten tracks. The normal average rate of change of the bias estimator value can be calculated using the relationship (w(1)−w(2))/10. This step can be implemented, for example, in module 425 shown in FIG. 4. Next, in the step shown at block 535, the method includes calculating the normal average PES value, for example over one hundred tracks. This step can be implemented, for example, in module 430 shown in FIG. 4.

Next as is illustrated at blocks 540 and 545, the method includes the steps of continuing to seek toward the ID track and recording the PES values along the way. For example, the method can include seeking toward the ID track one track at a time using controller 405, and recording the PES value for each track along the way using module 430. After seeking one track and recording the PES value for that track, the method includes the step illustrated at block 550 of determining whether the track PES for that track is greater than a predetermined percentage of the average PES value calculated in step 535. In one particular embodiment, the predetermined percentage is 150%. If the track PES for a particular track is not greater than the predetermined percentage (e.g., 150%) of the average PES, then at the step shown at block 560, the determination is made whether the track PES is greater than the maximum budgeted PES discussed above. These steps can be implemented in module 430 as well.

If in either of steps 550 or 560 an affirmative answer is reached for the particular condition, then at the step illustrated at block 555 it is determined whether this affirmative answer has been reached for more than a predetermined number of consecutive tracks, for example five consecutive tracks. If the condition leading to the affirmative answer in either of steps 550 or 560 has been existent for more than the predetermined number of consecutive tracks, then it is determined at the step 580 that the crash stop or last usable track has been found.

If a negative answer results in both of steps 550 and 560, then the method proceeds to the step illustrated at block 565 in which the average slope of the bias estimator value over a predetermined number of tracks is recorded. In one particular embodiment, the predetermined number of tracks over which the average slope of the bias value is recorded is ten tracks. The average slope of the bias value over ten tracks can be calculated using the relationship w(k)−w(k−10). At the step illustrated in block 570, a determination is made as to whether the average bias slope over the predetermined number of tracks, determined in step 565, exceeds a predetermined percentage of an overall average bias slope. In one particular embodiment, the predetermined percentage of the overall average bias slope is 130%. These steps can be implemented, for example, using module 425 shown in FIG. 4.

If at step 570 it is determined that the average bias slope recorded in step 565 is greater than the predetermined percentage of the overall average bias slope, then it is determined at the step 580 that the crash stop or last usable track has been found. If at step 570 it is determined that the average bias slope recorded in step 565 is not greater than the predetermined percentage of the overall average bias slope, then if it is determined at step 575 that the controller is still on track (for example based upon servo information), the method returns to step 540 and continues for another track. If it is determined at step 575 that the controller is not still on track, then it is determined at the step 580 that the crash stop or last usable track has been found.

In various embodiments, which of the modules of processing circuitry 420 is configured to implement or perform various steps can vary as desired. For example, modules 425 and 430 can be used for recording PES and bias related parameters, while the decision logic is implemented in module 435. However, in other embodiments, the decision logic is divided among the modules of circuitry 420, with module 435 identifying the last usable track location and the achieved maximum track location.

The methods and procedures described above were initially used to test four disc drive data storage systems for verification of the inventive concepts. It was noted in the testing that due to the multiple disc writer (MDW) process, not all of the drives could seek the entire way to or near the ID crash stop. This is believed to be due to the MDW process not writing beyond the data zones toward the crash stop. Nonetheless, an average of over 4000 extra tracks (individually 3760, 5072, 4480, and 3840 for the four drives) were accessible and readable between the achieved maximum track location and the last tracks written on the MDW discs. It is expected that larger numbers of additional tracks can be identified with modification of the MDW process to write all the way to the ID crash stop. Based upon the mean and 3-sigma (sample size issue) and a conservative estimation, it can be safely assumed that an extra 2000 tracks can be obtained, based upon a 105 kilo tracks per inch (KTPI) servo format, with the methods of the present invention. This translates into a minimum of about 0.25 dB SNR gain, and this gain number has the potential to increase in designs with high TPI targeted numbers.

The present invention facilitates the adaptive and reliable expansion of the recording bands across individual drives in factory processes. The extra real estate gained for recording (recording band expansion) helps to drive down the areal density requirement, and eventually narrows the SNR gap. The methods of the present invention can also be used to salvage drives with poor SNR, and in turn, improve process yields.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the mass storage device or system while maintaining substantially the same functionality without departing from the scope and spirit of the present invention. In addition, although the preferred embodiment described herein is directed to a disc drive data storage system type of mass storage device, it will be appreciated by those skilled in the art that the teachings of the present invention can be applied to any mass storage devices which utilizes a recording band on a media surface, without departing from the scope and spirit of the present invention.

What is claimed is:

1. A method comprising:
   identifying a last usable track on a recording media surface, beyond a default maximum track, as a function of when an average bias slope of a bias parameter, associated with an actuator which positions a data head over the recording media, exceeds a predetermined percentage of an overall average bias slope; and
   defining a standoff band of tracks relative to the last usable track to obtain an achieved maximum track on the surface.

2. The method of claim 1, and further comprising identifying the last usable track as a function of when the bias parameter is indicative of an obstruction encountered by the actuator.

3. The method of claim 2, wherein the obstruction is an inner diameter crash stop.

4. The method of claim 3, and further comprising identifying the last usable track as a function of when a rate of change of the bias parameter exceeds a threshold rate of change of the bias parameter.

5. The method of claim 1, and further comprising identifying the last usable track as a function of a position error signal (PES) value.

6. The method of claim 5, wherein identifying the last usable track as a function of the PES value further comprises identifying the last usable track as a function of when the PES value exceeds a predetermined percentage of an average PES value.

7. The method of claim 5, wherein identifying the last usable track as a function of the PES value further comprises identifying the last usable track as a function of when a track PES exceeds a predetermined percentage of a maximum budgeted PES.

8. The method of claim 1, wherein defining the standoff band of tracks further comprises categorizing 400 tracks outside of the last usable track to obtain the achieved maximum track on the surface.

9. A system comprising:
   a controller configured to control movement of a head/actuator over a surface; and
   processing circuitry coupled to the controller and configured to execute the steps:
      identifying a last usable track on the surface, beyond a default maximum track, as a function of when a track position error signal (PES) exceeds a predetermined percentage of a maximum budgeted PES; and
      defining a standoff band of tracks relative to the last usable track to obtain an achieved maximum track on the surface.

10. The system of claim 9, and further comprising identifying the last usable track as a function of a bias parameter, indicative of a bias force on the actuator, by determining when the bias parameter exceeds a threshold.

11. The system of claim 10, wherein the bias parameter is an average bias slope, and wherein identifying the last usable track as a function of the bias parameter further comprises determining when the average bias slope exceeds a predetermined percentage of an overall average bias slope.

12. The system of claim 9, and further comprising identifying the last usable track as a function of when a rate of change of a bias parameter exceeds a threshold rate of change of the bias parameter.

13. A method comprising:
   identifying a last usable track on a recording media surface, beyond a default maximum track, as a function of a position error signal (PES) value, wherein the position error signal represents a distance from a read head's current position to a desired target position, wherein identifying the last usable track as a function of the PES value further comprises identifying the last usable track as a function of when the PES value exceeds a predetermined percentage of a average PES value; and defining a standoff band of tracks relative to the last usable track to obtain an achieved maximum track on the surface.

14. The method of claim 13, wherein identifying the last usable track as a function of the PES value further comprises identifying the last usable track as a function of when a track PES exceeds a predetermined percentage of a maximum budgeted PES.

* * * * *